United States Patent
Menendez Martin et al.

(10) Patent No.: US 7,283,693 B2
(45) Date of Patent: Oct. 16, 2007

(54) METHOD TO MONITOR STRUCTURAL DAMAGE OCCURRENCE AND PROGRESSION IN MONOLITHIC COMPOSITE STRUCTURES USING FIBRE BRAGG GRATING SENSORS

(75) Inventors: Jose Manuel Menendez Martin, Madrid (ES); Alfredo Guemes Gordo, Madrid (ES)

(73) Assignee: Airbus Espana, S.L., Madrid (ES)

( * ) Notice: Subject to any disclaimer, the term of this patent is extended or adjusted under 35 U.S.C. 154(b) by 0 days.

(21) Appl. No.: 11/296,855

(22) Filed: Dec. 7, 2005

(65) Prior Publication Data

US 2006/0140532 A1   Jun. 29, 2006

(30) Foreign Application Priority Data

Dec. 28, 2004 (EP) .................................. 04107032

(51) Int. Cl.
*G02B 6/34* (2006.01)
(52) U.S. Cl. .......................................... 385/13; 385/37
(58) Field of Classification Search ................. 385/12, 385/13, 37
See application file for complete search history.

(56) References Cited

U.S. PATENT DOCUMENTS 7,017,421 B2 *   3/2006   Kehlenbach ................. 73/800

* cited by examiner

*Primary Examiner*—Tina M. Wong
(74) *Attorney, Agent, or Firm*—Ladas & Parry LLP

(57) ABSTRACT

A method of monitoring structural damage in a composite structure manufactured by co-curing, co-bonding or secondary bonding of several sub-components (7, 8), using fibre optic Bragg grating sensors attached or embedded to or between (in the bonding line) said sub-components, comprising a first step of measuring the wavelength spectra (31, 33, 40) of said Bragg grating sensors at the end of the manufacturing of the part, and in a known load condition, considered as reference and a second step of identifying the occurrence of a failure of the structure and the progress of said failure detecting the release of the residual stresses/strains stored during the curing process by measuring changes (31 to 32, 33 to 34, 40 to 41) with respect to said reference wavelength spectra.

4 Claims, 6 Drawing Sheets

US 7,283,693 B2

METHOD TO MONITOR STRUCTURAL DAMAGE OCCURRENCE AND PROGRESSION IN MONOLITHIC COMPOSITE STRUCTURES USING FIBRE BRAGG GRATING SENSORS

FIELD OF INVENTION

In service health monitoring and damage assessment of composite structures.

BACKGROUND OF INVENTION

Intensive introduction of advanced composite materials in primary structures has became a fundamental approach for structural optimisation (based upon weight saving and improve performances), one of the priority goals in the design and manufacturing of new generation of commercial aircrafts. The implementation of an effective structural health monitoring (SHM) system, capable of predict failure of load paths in a structure designed following damage tolerance criteria would allow to optimise its design, and consequently reducing its weight. Fibre optic Bragg grating sensors (FBGs) have ability to measure mechanical strain with multiple additional advantages over electrical gauges, being considered, at the present time, the most qualified candidates to configure the new generation in-flight load monitoring systems. However, strain and load monitoring only allows predicting fatigue life until fracture for a certain probability of occurrence, and the distributed character of FBGs difficults the detection of local damage events, which only have effects on the near strain and stress fields, thus these devices has been then only anecdotally considered as damage sensors.

However, there are cases in which FBGs can be effectively used as damage sensors: monolithic structures composed by a skin with attached stiffeners or stringers: the failure of one these elements (by debonding, delamination of the skin or the flange of the reinforcing element, or even its breakage) causes a complete load re-distribution than can be easily detected by a simple strain sensing network, as the points required to be covered is limited. Moreover, the different stiffness of skin and stringer is associated to the storing of residual stresses/strains, which release when the part fails. This effect would allow the detection of the failure event in a known load condition (a reference condition), analysing the release of the residual stresses/strains by measuring its effect over the spectrum of a nearby FBG. This technique may be extended to composite and metallic structures with composite repair patches.

The ideas summarised above allows to establish the basis for a complete FBG based structural health monitoring system, based in the complete analysis of the spectral behaviour of the FBGs integrated in a structure, based in the following principles:

1. Detection of uniform longitudinal strain/stress release before and after damage occurrence, which promotes spectral shifts in nearby FBGs.
2. Detection of non-uniform longitudinal/transverse strain/stress release, which promote spectral distortions in nearby FBGs.
3. Detection of transverse strain/stress release, which promotes birefringence effects in nearby FBGs, with a subsequent influence in the spectral peak splitting.

The measurement of uniform strain is well known and straightforward, so most of efforts have to be oriented to characterise FBGs spectral distortions promoted by strains and stresses fields perturbations (discrimination of phenomena, repetitivity of the correspondence event severity/signal level, detection of false alarms, etc.).

A first and simple approach to this method requires only from the record and analysis of the evolution of the spectra of the FBGs at equivalent loading conditions (or at a known reference load condition), after service. Depending on the demodulation technique used, different type and amount of data are acquired, different methods of analysis have to be implemented, and different quality of information is obtained. For instance: a full spectrum acquisition facilitates the discrimination of phenomena, whereas peak detection based systems only allows detecting strong amplitude/wavelength variations.

BRIEF DESCRIPTION OF THE INVENTION

In view of the above it is a broad object of this invention to integrate a fibre optic sensing network composed by FBGs distributed in adequate positions, integrated (attached or embedded) into a monolithic composite structure, in order to detect the failure of the part.

The monitored part is a composite structure manufactured by co-curing, co-bonding or secondary bonding of several sub-components, and an integrated fibre optic sensing network.

The fibre optic sensing network is composed by one or several optical fibres, each one with one or several fibre optic sensors superficially attached to or embedded into the composite part.

The failure of the composite part promotes a perturbation in the local residual stresses/strains fields measured by the FBGs in a known load condition (considered as a reference condition), perturbation that is analysed and identified as a consequence of the damage occurrence.

BRIEF DESCRIPTION OF THE DRAWINGS

This invention will be better understood when taken in conjunction with the drawings wherein.

DETAILED DESCRIPTION OF THE INVENTION

Figure 1:
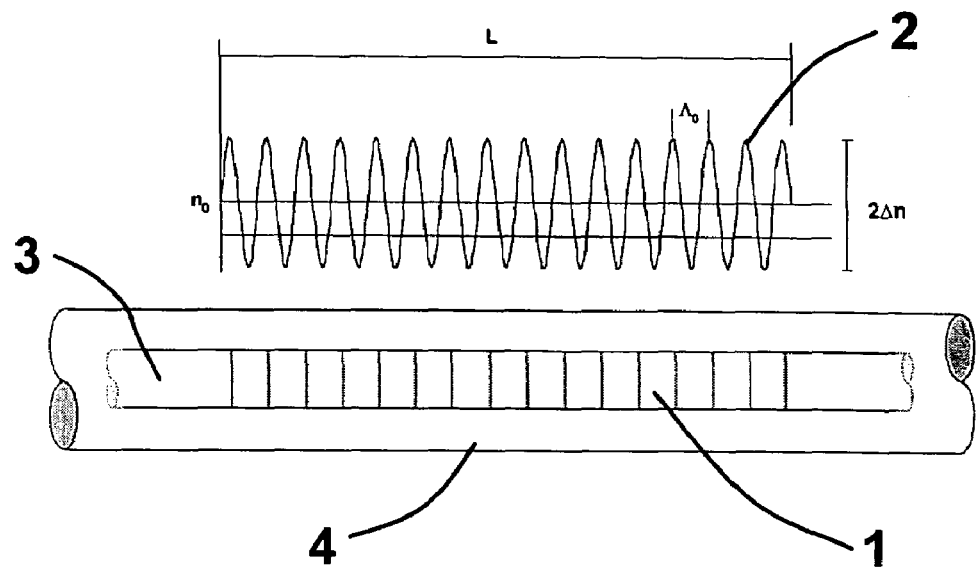
FIG. 1 is a schematic of a FBG, with a representation of its refractive index modulation.

As represented in FIG. 1, a fibre optic Bragg grating (FBG) 1 is a periodic pattern 2 induced in the refractive index of the core 3 of a fibre optic 4 by means of an intense UV holographic beam.

Figure 2:
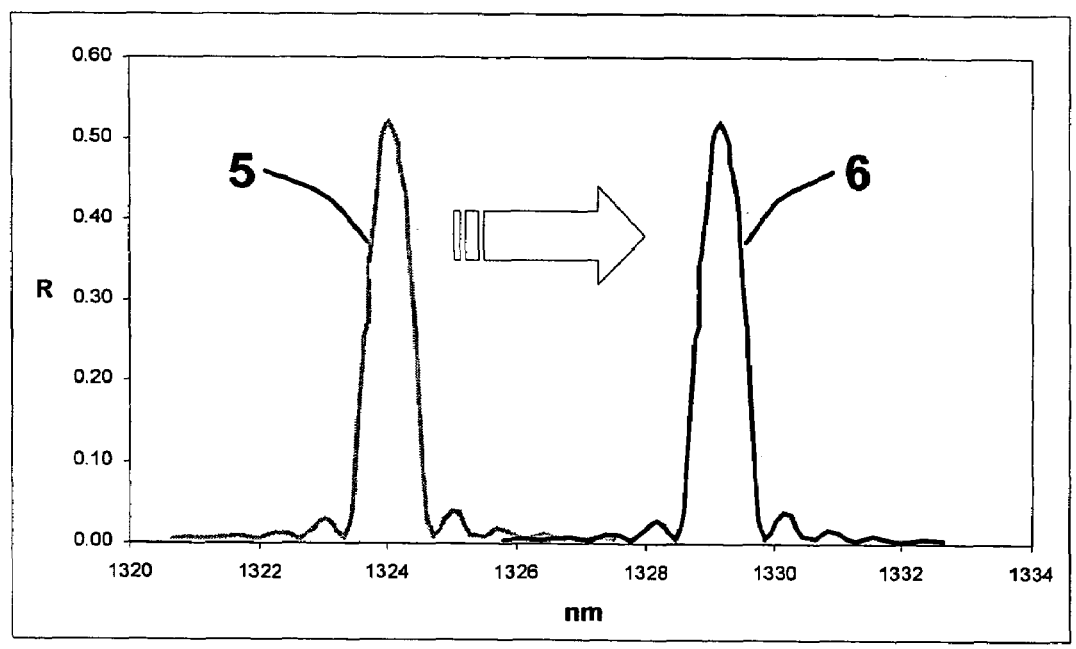
FIG. 2 is a representation of the reflective spectrum of a FBG, and the spectral shift promoted by a uniform longitudinal strain.

The periodic optical structure of a FBG behaves as a very narrow optical filter with its reflective spectrum, shown as 5 in FIG. 2, centred in a wavelength given by the Bragg condition, $I=2$ nL, where I is the central wavelength of the spectral signal of the grating (known as Bragg wavelength), n is the average effective refractive index along the grating, and L is the pitch of the periodic structure of the grating.

If a FBG is submitted to a uniform mechanical strain, the pitch and the refractive index of the grating changes, and the centre of the spectrum shifts to the position 6 given by the new Bragg condition. The relation between this strain and the wavelength shift is absolutely linear. Something similar happens with thermal strain. This singular photoelastic and thermo-optical behaviour, and their low profile, allow fibre Bragg gratings (FBGs) to be used as optical strain gauges in multiple applications, even embedded as internal strain sensors in advanced composite materials.

Figure 3:
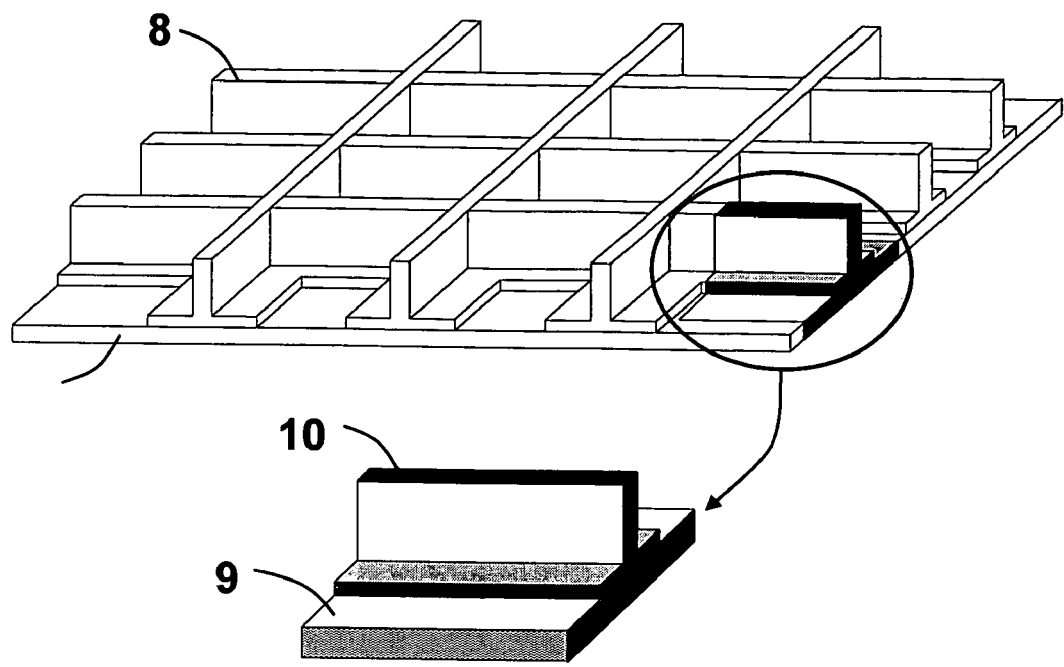
FIG. 3 is a representational view of a monolithic composite part composed by a skin and a reinforcing and/or stiffening structure, and a detail of the part composed by a portion of skin and a part of a stiffener, that will be use as a sample to explain the operation principles of the invention

FIG. 3 represents a sample of the first operation in the implementation of the proposed invention: the integration of a network of FBGs in a sample part, a structure composed by a skin 7, that can be pre-cured or uncured, and a stiffening structure 8, pre-cured or uncured. In order to simplify the problem, we will considerate a sub-part of the structure, consistent in a portion of skin 9 and the correspondent stiffener 10.

Figure 4:
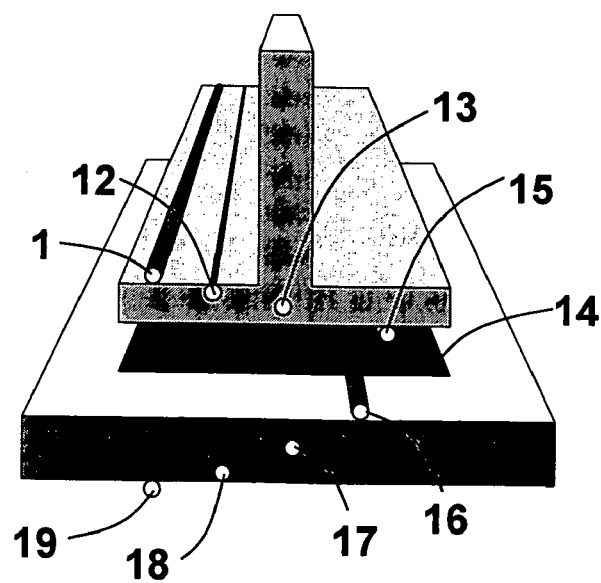
FIG. 4 is a magnification of the sample of FIG. 3, showing integrated optical fibres in several probable positions in the part: superficially attached or embedded into the skin or the reinforcement/stiffener, internally embedded into the skin or the reinforcement/stiffener, and/or embedded into the bonding line (at any of both sides of the adhesive layer, if it is present). The geometry of the reinforcing/stiffening element represented in the sample is a typical T section, but the invention is applicable in any reinforcing/stiffening configuration (I section, J, section, U section, hat section, inverted hat section, etc.).

FIG. 4 represents a frontal view of the sub-part of FIG. 3, where integrated optical fibres are shown: a fibre optic superficially bonded to the reinforcement/stiffener 11, superficially embedded into the reinforcement/stiffener 12, internally embedded into the reinforcement/stiffener 13, embedded into the bonding line, between the adhesive layer 14 (if adhesive is used, as adhesive is not required in co-curing processes) and the reinforcement/stiffener 15, or between the adhesive layer (if adhesive is used) and the skin 16, internally embedded into the skin 17, superficially embedded into the skin 18 or superficially bonded to the skin 19.

Figure 5:
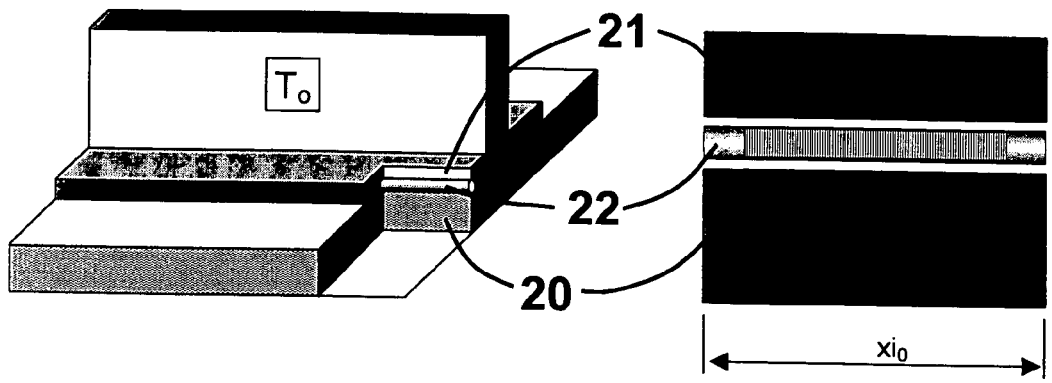
FIG. 5 is the same view of FIG. 4 immediately before the start of the curing/bonding process. Skin and reinforcement/stiffener are separated parts with the geometry and dimensions correspondent to room temperature. A section shows the position of a fibre optic embedded in the interface of skin and reinforcement/stiffener.

The structure will consolidate in a curing process, in which a temperature and pressure cycles are applied. FIG. 5 is a magnification of the sub-part of FIG. 3, at room temperature, before the heating phase of the high temperature consolidation process. Skin, reinforcement/stiffener and fibres present the dimensions correspondent to room temperature xio. A section of the subpart shows, as example, the relative position of a fibre optic 22 embedded into the bonding line between the skin 20 and the reinforcement/stiffener 21 (results can be extended to the cases of a fibre optic superficially bonded or embedded into the skin or the reinforcement/stiffener in a previous curing cycle or during the final consolidation process).

Figure 6:
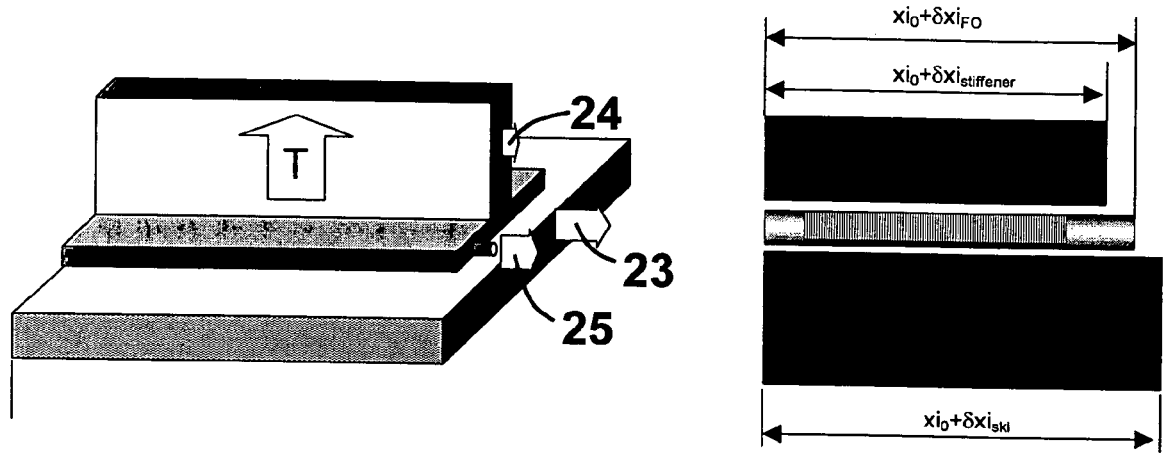
FIG. 6 is the same view of FIG. 4 during the heating phase of the high temperature assembly process. The expansion coefficients of the skin, the reinforcement/stiffener and the embedded fibre optics are different and, until the vitrification of the adhesive and the resin of the un-cured parts, there is a relative movement between all the elements. Although only longitudinal effects have been represented, the phenomenon is tri-dimensional.

During the heating phase of the consolidation process, shown in FIG. 6, if the stacking sequence of the skin and the reinforcement/stiffener are different, their longitudinal and transversal expansion coefficients, and the expansion coefficient of the embedded fibre are different and, during the initial part of the cycle, before the consolidation of the part, that happens at a temperature higher the than initial room temperature, the evolution of the skin 23, reinforcement/stiffener 24 and fibre optic 25 are independent.

Figure 7:
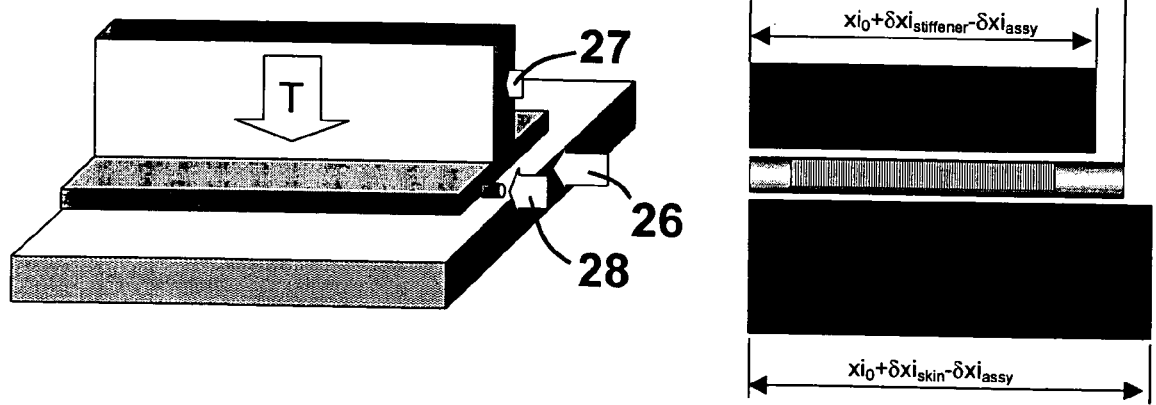
FIG. 7 is the same view of FIG. 4 during the cooling phase of the high temperature assembly process. As the skin, the stiffener and the embedded fibres have consolidated at high temperature, the relative movement has become a permanent shift between all the elements, and their differential shrinkage drives to the storing of residual stresses/strains. Although only longitudinal effects have been represented, the phenomenon is tri-dimensional.
Figure 8:
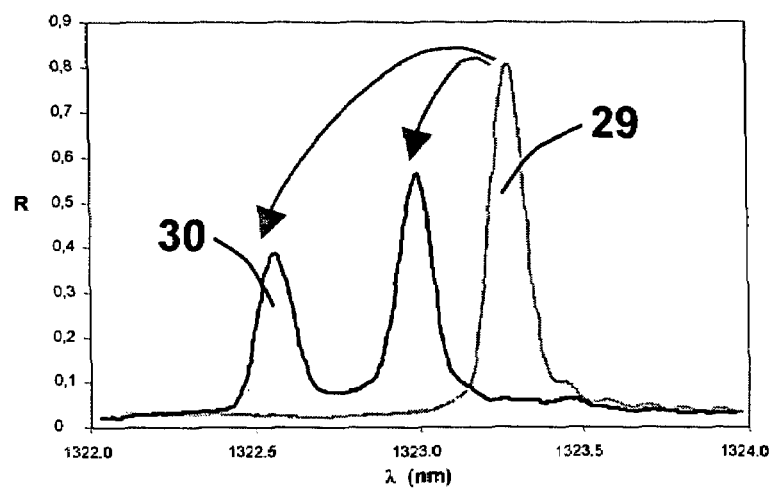
FIG. 8 shows the evolution of the reflective of the spectrum of a fibre Bragg grating embedded in a composite part during the consolidation process. Thermal longitudinal residual stresses/strains promotes a general shift of the reflective spectrum, and transverse stresses/strains forces a splitting.

After this consolidation, and during the cooling phase of the process, shown in FIG. 7, the shrinkage of the part causes promotes an evolution of the longitudinal and transverse strains/stresses field around the integrated FBG that can be detected by means of a perturbation of its reflective spectrum (see sample spectra of FIG. 8), generally consistent in:

A global wavelength shift (in FIG. 8, estimatively represented by the shift of the gravity centre of the spectrum, from 29 to 30), consequence mainly from the longitudinal strain applied to the grating.

Figure 9:
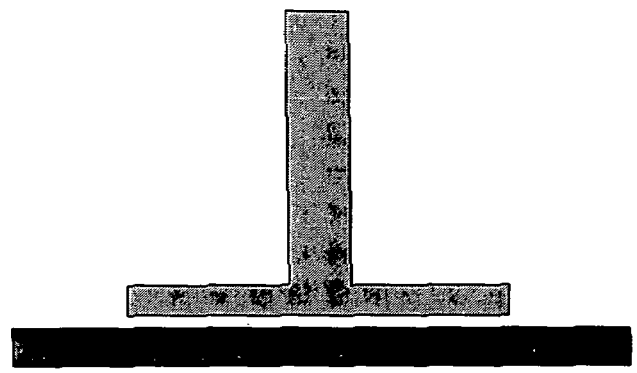
FIG. 9 is the same view of FIG. 5, representing a de-bonding between skin and reinforcement/stiffener. In this case, a FBG embedded in the bonding line may remain bonded to the skin or separate from the skin with the de-bonded reinforcement/stiffener.

A spectral splitting (easily observable in FIG. 8, with a clear evolution from spectrum 29 to spectrum 30) caused by an optical birefringence effect promoted by the thermal residual transverse stresses/strains resultant over the grating The invention would be intended to detect the following possible modes of failure of the interface skin/(reinforcement/stiffener):

Debonding of the reinforcement/stiffener (FIG. 9)

Figure 10:
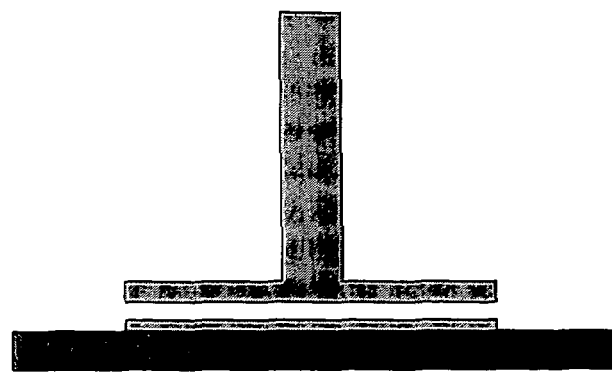
FIG. 10 is the same view of FIG. 4, representing a delamination of the reinforcement/stiffener. In this case, FBGs embedded in the bonding line remains bonded at the skin.

Delamination of the flange of the reinforcement/stiffener (FIG. 10)

Figure 11:
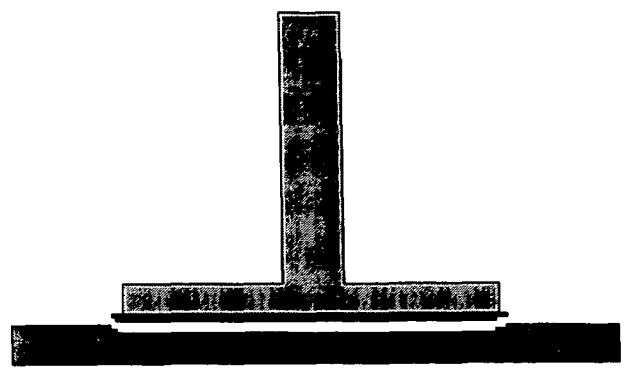
FIG. 11 is the same view of FIG. 4, representing a delamination of the skin. In this case, FBGs embedded in the bonding line separates from the skin with the de-bonded reinforcement/stiffener.

Delamination of the skin (FIG. 11)

In all the cases, with the part loaded in a known load case (considered as a reference load condition), at the proximity of the damage, the skin, the reinforcement/stiffener and the integrated FBGs will be submitted to a strains/stresses field different than the initial field of the undamaged structure, due to the release of the stored residual stresses/strains.

Figure 12:
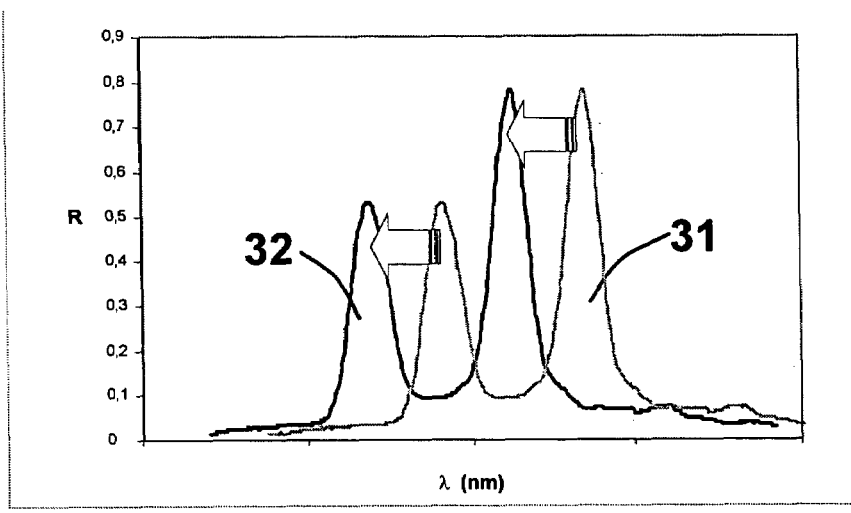
FIG. 12 shows a representation of the evolution of the reflective spectrum of a fibre Bragg grating embedded in a composite part promoted by uniform longitudinal residual stresses/strains released in a damage event.
Figure 13:
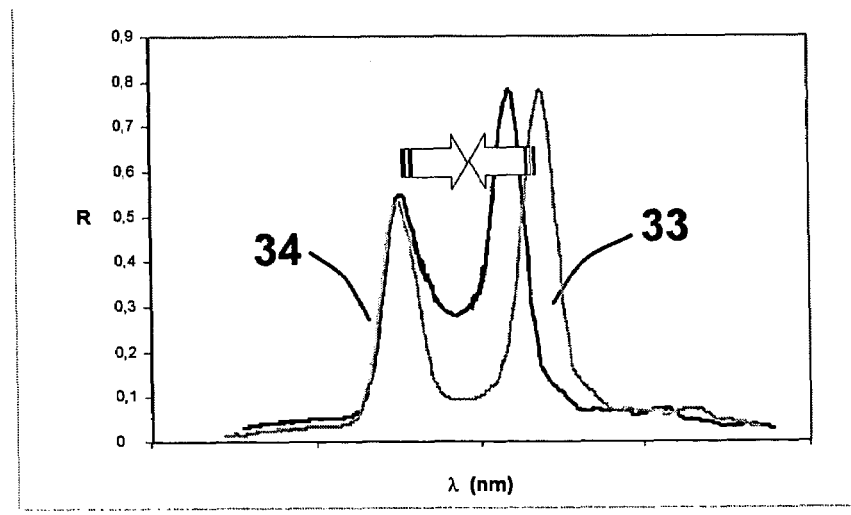
FIG. 13 shows a representation of the evolution of the reflective spectrum of a fibre Bragg grating embedded in a composite part promoted by uniform transverse residual stresses/strains released in a damage event.

Then, the integrated FBGs will show a perturbation in their reflective spectra reflecting this effect: a spectral shift (see FIG. 12, with an evolution from 31 to 32), correspondent to a longitudinal stresses/strains release, and/or a change in the distance between the two peaks (see FIG. 13, with an evolution from 33 to 34), correspondent to a transverse stresses/strains release. Positive detection of these effects would allow identifying the occurrence of failure of the monitored part.

Figure 14:
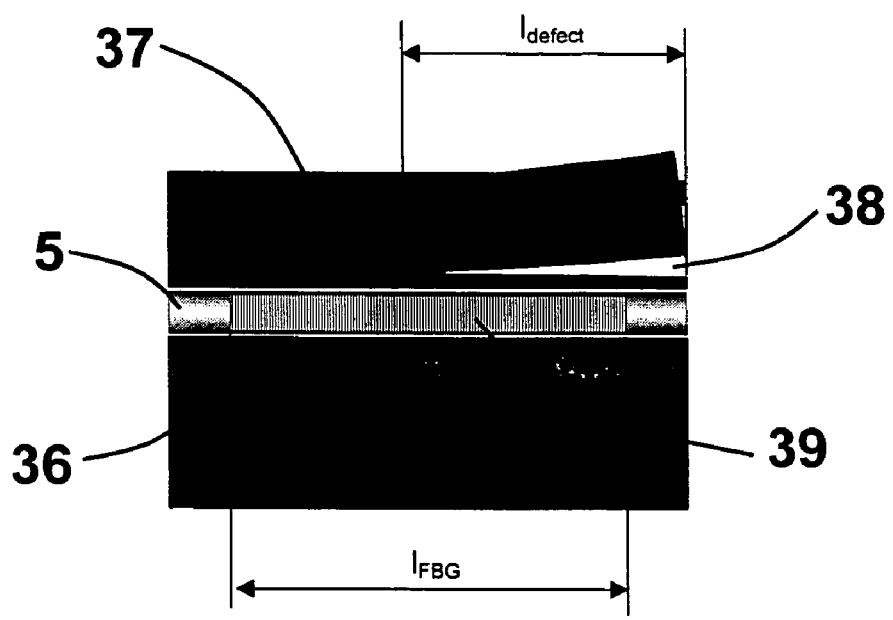
FIG. 14 shows the section of FIG. 8 with a local damage (schematically represented as a delamination) partially affecting a FBG.
Figure 15:
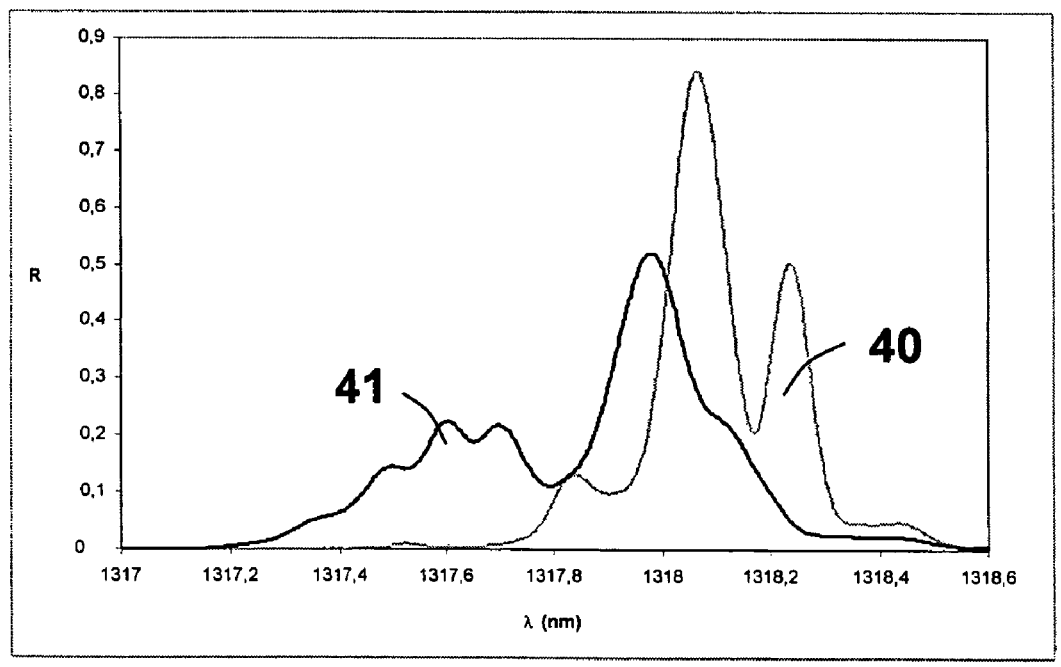
FIG. 15 shows a representation of the evolution of the reflective spectrum of a fibre Bragg grating embedded in a composite part promoted by a non-uniform residual stresses/strains release in a damage event similar as that represented in FIG. 14.

The invention would be intended also to detect the progression of the failure near the integrated FBGs. FIG. 14 shows the same detailed section of FIG. 5, with a fibre optic 35 embedded into the bonding line of the skin 36 and the reinforcement/stiffener 37. The progression of a damage event 38 (delamination, debonding . . . ) near the FBG sensor 39 would promote a non-uniform strain field, variable in time, and a subsequent spectral distortion (see sample spectrum of FIG. 15, with an evolution from 40 to 41). Positive detection of this effect would allow identifying the occurrence and progression of failure of the monitored part.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes that come within meaning and range of equivalency of the claims are therefore intended to be embraced therein.

The invention claimed is:

1. A method of monitoring structural damage in a composite structure manufactured by co-curing, co-bonding or secondary bonding of several sub-components (7, 8), using fibre optic Bragg grating sensors attached or embedded to or between (in the bonding line) said sub-components, characterised by comprising the steps of:
   a) measuring the wavelength spectra (31, 33, 40) of said Bragg grating sensors at the end of the manufacturing of the part, and in a known load condition, considered as reference;
   b) identifying the occurrence of a failure of the structure and the progress of said failure detecting the release of the residual stresses/strains stored during the curing process by measuring changes (31 to 32, 33 to 34, 40 to 41) with respect to said reference wavelength spectra.

2. A method according to claim 1, wherein a change of the wavelength spectrum (31 to 32) consisting of a shift of the intensity peaks allows the identif-cation of a failure causing a longitudinal stress release.

3. A method according to claim 1, wherein a change of the wavelength spectrum (33 to 34) consisting of a change in the distance between the intensity peaks allows the identification of a failure causing a transverse stress release.

4. A method according to claim 1, wherein a change of the reflective spectrum (40 to 41) consisting of a general spectral distortion allows the detection of a failure causing a non-uniform longitudinal and/or transverse stress release.

* * * * *